United States Patent
Higgins et al.

(10) Patent No.: US 10,437,241 B2
(45) Date of Patent: Oct. 8, 2019

(54) SYSTEMS AND METHODS FOR GENERATING MAINTENANCE PACKAGES

(71) Applicant: General Electric Company, Schenectady, NY (US)

(72) Inventors: Christopher Dean Higgins, Greenville, SC (US); John Robert Korsedal, Greenville, SC (US); Carlos Hein, Greenville, SC (US); Ryan Adam Conger, Minden, NV (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 15/382,174

(22) Filed: Dec. 16, 2016

(65) Prior Publication Data

US 2018/0173214 A1 Jun. 21, 2018

(51) Int. Cl.
*G05B 23/02* (2006.01)
*G06Q 10/00* (2012.01)

(52) U.S. Cl.
CPC ......... *G05B 23/0272* (2013.01); *G06Q 10/20* (2013.01); *Y04S 10/522* (2013.01)

(58) Field of Classification Search
CPC ...... F02C 6/18; F02C 9/00; F02C 9/28; F02C 9/50; Y02E 10/723
USPC ...................... 60/239; 700/29, 287; 701/100; 702/183, 184; 705/305, 7.12
See application file for complete search history.

(56) References Cited

U.S. PATENT DOCUMENTS

| | | | |
|---|---|---|---|
| 4,510,492 | A | 4/1985 | Mori et al. |
| 4,783,999 | A | 11/1988 | Kimball |
| RE32,887 | E | 3/1989 | Mori et al. |
| 5,043,929 | A | 8/1991 | Kramer et al. |
| 5,253,189 | A | 10/1993 | Kramer |
| 5,297,057 | A | 3/1994 | Kramer et al. |
| 5,475,189 | A | 12/1995 | Field et al. |
| 5,605,849 | A | 2/1997 | Chen et al. |
| 5,699,268 | A | 12/1997 | Schmidt |
| 5,726,069 | A | 3/1998 | Chen et al. |
| 5,837,588 | A | 11/1998 | Wu |
| 5,862,786 | A | 1/1999 | Fuchs et al. |
| 5,899,723 | A | 5/1999 | Chen et al. |
| 5,936,277 | A | 8/1999 | Takeuchi |
| 5,974,566 | A | 10/1999 | Ault et al. |
| 5,986,305 | A | 11/1999 | Wu |
| 6,001,695 | A | 12/1999 | Wu |

(Continued)

*Primary Examiner* — Jonathan Han
(74) *Attorney, Agent, or Firm* — Fletcher Yoder, P.C.

(57) ABSTRACT

A power plant system includes a turbine system, a sensor, and a controller. The sensor is configured to collect a first set of data regarding the turbine system. The controller is configured to receive user input regarding constraints of the turbine system, a second set of data regarding the power plant system, and the first set of data. The controller is configured to determine whether a first notification is present based on a determined status and to generate a first maintenance package based on the first notification, life odometer solutions, condition monitoring solutions, and the first set of data. The controller is configured to generate a model of implementing the first maintenance package with respect to the turbine system as well as to generate a second maintenance package based on the user input, the second set of data, the first maintenance package, and the scenario model.

20 Claims, 3 Drawing Sheets

(56) References Cited

U.S. PATENT DOCUMENTS

| | | | |
|---|---|---|---|
| 6,078,586 A | 6/2000 | Dugan et al. | |
| 6,216,099 B1 | 4/2001 | Fang et al. | |
| 6,219,622 B1 | 4/2001 | Schmidt | |
| 6,243,535 B1 | 6/2001 | Bochud | |
| 6,466,840 B1 | 10/2002 | Schoch | |
| 6,472,899 B2 | 10/2002 | Osburn et al. | |
| 6,549,880 B1 | 4/2003 | Willoughby et al. | |
| 6,556,928 B2 | 4/2003 | Schoch | |
| 6,671,857 B1 | 12/2003 | Motohara et al. | |
| 6,782,295 B2 | 8/2004 | Martz, Jr. et al. | |
| 7,110,492 B2 | 9/2006 | Ulyanenkov et al. | |
| 7,130,771 B2 | 10/2006 | Aghassipour | |
| 7,154,993 B2 | 12/2006 | Ulyanenkov et al. | |
| 7,212,424 B2 | 5/2007 | Johnson et al. | |
| 7,365,585 B2 | 4/2008 | Fort et al. | |
| 7,404,101 B2 | 7/2008 | Fishkin et al. | |
| 7,628,351 B2 | 12/2009 | Wohlfahrt et al. | |
| 7,756,688 B2 | 7/2010 | Averill et al. | |
| 7,847,331 B2 | 12/2010 | Ishimaru et al. | |
| 7,878,441 B2 | 2/2011 | Wohlfahrt et al. | |
| 7,897,925 B2 | 3/2011 | Goldberg et al. | |
| 7,987,067 B2 * | 7/2011 | Harrison | F03D 7/046 702/122 |
| 8,003,317 B2 | 8/2011 | Beaulieu et al. | |
| 8,060,201 B2 | 11/2011 | Holmstrom et al. | |
| 8,065,022 B2 * | 11/2011 | Minto | F01D 11/20 60/350 |
| 8,076,709 B2 | 12/2011 | Ishimaru et al. | |
| 8,078,489 B1 | 12/2011 | Marsten | |
| 8,085,794 B1 | 12/2011 | Niver et al. | |
| 8,086,988 B2 | 12/2011 | Buck et al. | |
| 8,143,575 B2 | 3/2012 | Goldberg et al. | |
| 8,349,566 B2 | 1/2013 | Beaulieu et al. | |
| 8,484,285 B2 | 7/2013 | Bretin | |
| 8,498,889 B1 | 7/2013 | Marsten | |
| 8,521,337 B1 | 8/2013 | Johnson | |
| 8,527,994 B2 | 9/2013 | Bose et al. | |
| 8,531,937 B2 | 9/2013 | Levy | |
| 8,627,114 B2 | 1/2014 | Resch et al. | |
| 8,639,481 B2 | 1/2014 | Dotan et al. | |
| 8,639,483 B1 | 1/2014 | Walski et al. | |
| 8,648,308 B2 | 2/2014 | Knowles et al. | |
| 8,648,443 B2 | 2/2014 | Lin et al. | |
| 8,650,362 B2 | 2/2014 | de la Iglesia et al. | |
| 8,670,960 B2 | 3/2014 | Couet et al. | |
| 8,682,428 B2 | 3/2014 | Holmstrom et al. | |
| 8,756,092 B1 | 6/2014 | Marsten | |
| 8,773,789 B1 | 7/2014 | Chang et al. | |
| 8,793,202 B2 | 7/2014 | Wang et al. | |
| 8,842,746 B2 | 9/2014 | Gladwin et al. | |
| 8,881,143 B2 | 11/2014 | Prabhakaran et al. | |
| 8,917,583 B2 | 12/2014 | Levy | |
| 8,966,194 B2 | 2/2015 | Resch et al. | |
| 9,063,968 B2 | 6/2015 | Resch | |
| 9,068,223 B2 | 6/2015 | Beaulieu et al. | |
| 9,129,074 B2 | 9/2015 | Auberon et al. | |
| 9,143,499 B2 | 9/2015 | Resch et al. | |
| 9,171,250 B2 | 10/2015 | Wang et al. | |
| 9,258,040 B2 | 2/2016 | Levy | |
| 9,283,826 B2 | 3/2016 | Heckenberger et al. | |
| 9,317,920 B2 | 4/2016 | Gluncic | |
| 9,336,091 B2 | 5/2016 | Harnik et al. | |
| 9,424,180 B2 | 8/2016 | de la Iglesia | |
| 9,430,297 B2 | 8/2016 | Thai et al. | |
| 9,444,531 B2 | 9/2016 | Levy | |
| 9,451,025 B2 | 9/2016 | Kazi et al. | |
| 9,466,687 B2 | 10/2016 | Lin et al. | |
| 9,479,388 B2 | 10/2016 | Castel et al. | |
| 2007/0078585 A1 * | 4/2007 | Pomeroy | G01C 23/00 701/100 |
| 2013/0179356 A1 * | 7/2013 | Pawlowski | F01D 21/00 705/305 |
| 2014/0019091 A1 * | 1/2014 | Higgins | G06F 15/00 702/184 |

* cited by examiner

SYSTEMS AND METHODS FOR GENERATING MAINTENANCE PACKAGES

BACKGROUND

The subject matter disclosed herein relates to power plants, and more specifically, to systems and methods for generating maintenance packages of maintenance operations that can be performed on power plants, as well as the components within power plants.

Maintenance may be desired or necessary to enhance or repair a power plant system. To perform certain maintenance operations, the power plant system may be shut down to allow maintenance personnel to access various components within the power plant system. However, the shutdown of the power plant may cause a decrease in production, revenue, efficiency, and the like. As such, improved systems and methods for decreasing maintenance operations are desirable.

BRIEF DESCRIPTION

Certain embodiments commensurate in scope with the originally claimed embodiments are summarized below. These embodiments are not intended to limit the scope of the claims, but rather these embodiments are intended only to provide a brief summary of possible forms of the presently disclosed systems and techniques. Indeed, the presently disclosed systems and techniques may encompass a variety of forms that may be similar to or different from the embodiments set forth below.

In one embodiment, a power plant system includes a turbine system and a sensor. The sensor is configured to collect a first set of data regarding the turbine system. The power plant system also includes a controller that includes a processor. Additionally, the controller, via the processor, is configured to receive user input regarding operating constraints of the turbine system, a second set of data regarding the power plant system from memory, and the first set of data. The controller, via the processor, is also configured to determine a status of the turbine system based on the first set of data and the second set of data as well as determine whether a first notification is present based on the determined status. The controller, via the processor, is further configured to map one or more life odometer solutions, one or more condition monitoring solutions, and the first set of data based on the first notification. The life odometer solutions include an expected amount of time before one or more components of the turbine system is repaired, and the condition monitoring solutions include one or more conditions of the one or more components. The controller, via the processor, is also configured to generate a first maintenance package based on the first notification, the life odometer solutions, the condition monitoring solutions, and the first set of data; the first maintenance package includes one or more maintenance activities for the components. The controller, via the processor, is additionally configured to generate a model of implementing the first maintenance package with respect to the turbine system based on the user input, the second set of data, and the first maintenance package. Furthermore, the controller, via the processor, is configured to generate a second maintenance package based on the user input, the second set of data, the first maintenance package, and the scenario model.

In another embodiment, a method includes receiving, via a processor, user input regarding one or more operating constraints of an industrial asset, a first set of data regarding the industrial asset, and a second set of data from at least one sensor. The second set of data corresponds to a characteristic of the industrial asset. The method also includes determining, via the processor, a status of the industrial asset based on the first set of data and the second set of data as well as determining, via the processor, whether a notification is present based on the status. The method also includes mapping, via the processor, one or more life odometer solutions, one or more condition monitoring solutions, and the at least one sensor based on the notification. Mapping the life odometer solutions includes determining an amount of time before one or more components of the industrial asset is repaired, and mapping the condition monitoring solutions includes determining a condition of the one or more components. The method also includes generating, via the processor, a first maintenance package based on the notification, the life odometer solutions, the condition monitoring solutions, and the at least one sensor. The first maintenance package includes one or more maintenance activities. Moreover, the method includes generating, via the processor, a model of implementing the first maintenance package with respect to the industrial asset based on the user input, the first set of data, and the first maintenance package. Furthermore, the method includes generating, via the processor, a second maintenance package based on the user input, the first set of data, the first maintenance package, and the model.

In yet another embodiment, a non-transitory machine readable medium, includes computer executable instructions that are configured to cause a processor to receive user input regarding one or more operating constraints of an industrial asset, a first set of data regarding the industrial asset, and a second set of data from at least one sensor. The second set of data corresponds to a characteristic of the industrial asset. Also, the computer executable instructions are configured to cause the processor to determine a status of the industrial asset based on the first set of data and the second set of data as well as determine whether a first notification is present based on the status. The computer executable instructions are further configured to cause the processor to map one or more life odometer solutions, one or more condition monitoring solutions, and the at least one sensor based on the first notification. The life odometer solutions include an amount of time before one or more components of the industrial asset is repaired, and the condition monitoring solutions comprise a condition of the one or more components. Moreover, the computer executable instructions are configured to cause the processor to generate a first maintenance package based on the first notification, the life odometer solutions, the condition monitoring solutions, and the at least one sensor. The first maintenance package includes one or more maintenance activities. Additionally, the computer executable instructions are configured to cause the processor to generate a model of implementing the first maintenance package with respect to the industrial asset based on the user input, the first set of data, and the first maintenance package. Furthermore, the computer executable instructions are configured to cause the processor to generate a second maintenance package based on the user input, the first set of data, the first maintenance package, and the model.

BRIEF DESCRIPTION OF THE DRAWINGS

These and other features, aspects, and advantages of the presently disclosed systems and techniques will become better understood when the following detailed description is read with reference to the accompanying drawings in which like characters represent like parts throughout the drawings, wherein.

DETAILED DESCRIPTION

One or more specific embodiments of the presently disclosed systems and techniques will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed systems and techniques, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to systems and methods for generating maintenance packages of maintenance operations to be conducted on a power plant system and/or components of the power plant system. For example, during operation of the power plant system, a notification (e.g., an alarm) related to a status of the power plant system and its components may be present. Upon detecting the notification, a computing system may generate a maintenance package to address an issue associated with the notification. For instance, if the notification is related to an operation of a turbine of the power plant system, a maintenance package to remedy an undesirable characteristic of the turbine may be generated and presented to a user via a display. The maintenance package may include, among other things, schedules for performing corrective and preventative maintenance, specific maintenance activities (e.g., replace a specific component of the power plant system), and recommendations for how to improve a configuration of the power plant system in order to reduce the likelihood of performing maintenance activities at a future time. Additional details with regard to generating maintenance packages will now be discussed with reference to FIGS. 1-3.

Figure 1:
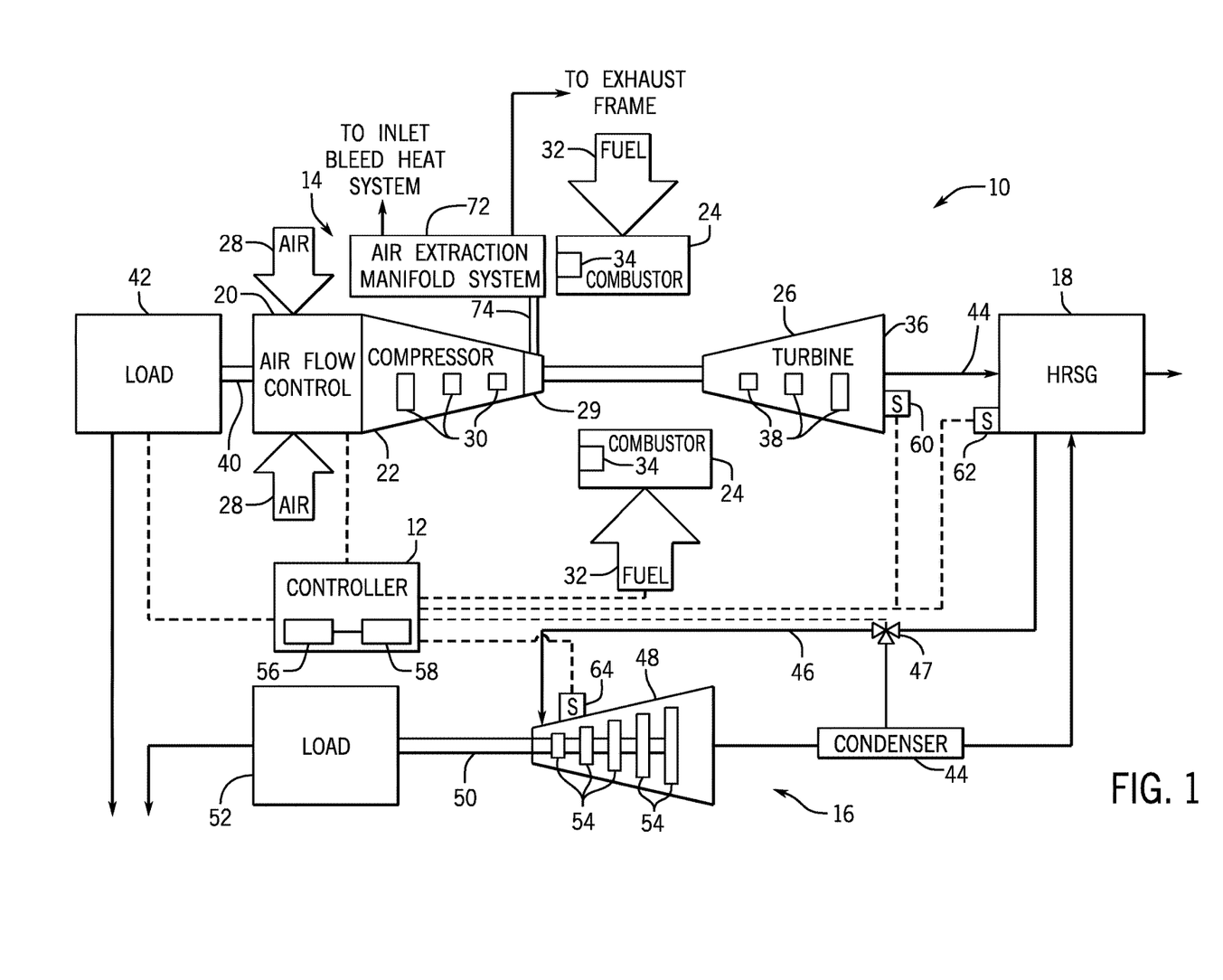
FIG. 1 is a block diagram of an example combined cycle power plant, in accordance with embodiments described herein.

By way of introduction, FIG. 1 is a block diagram of an embodiment of a combined cycle power plant 10 with a controller 12 that may include systems for generating maintenance packages. The combined cycle power plant 10 illustrates one example system that may employ the techniques described herein for generating maintenance packages. However, it should be understood that the presently disclosed techniques may be applied to a variety of systems and should not be limited to combined cycle power plants.

As shown in FIG. 1, the combined cycle power plant (CCPP) 10 includes the controller 12, gas turbine system 14, steam turbine system 16, and a heat recovery steam generator (HRSG) 18. In operation, the gas turbine system 14 combusts a fuel-air mixture to create torque that drives a load, e.g., an electrical generator. In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load, e.g., an electrical generator. Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, oxygen reduced air, etc.) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air 28 passes through the airflow control module 20, the air 28 enters the compressor 22. The compressor 22 pressurizes the air 28 in a series of compressor stages (e.g., rotor disks 30) with compressor blades. After the air 28 is pressurized, the pressurized air may reside in a compressor discharge chamber 29 before the compressed air exits the compressor 22.

After exiting the compressor 22, the compressed air enters the combustor 24 and is mixed with fuel 32 after entering the combustor 24. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, a plurality of fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the rotor disks 38. The rotation of the rotor disks 38 induces rotation of shaft 40 and the rotor disks 30 in the compressor 22. A load 42 (e.g., electrical generator) connects to the shaft 40 and uses the rotation energy of the shaft 40 to generate electricity for use by the power grid.

As explained above, the CCPP 10 harvests energy from the hot exhaust gases exiting the gas turbine system 14 for use by the steam turbine system 16 or a boiler. Specifically, the CCPP 10 channels hot exhaust gases 44 from the turbine system 14 into the HRSG 18. In the HRSG 18, the thermal energy in the combustion exhaust gases converts water into hot pressurized steam. The HRSG 18 releases the steam in line 46 for use in the steam turbine system 16.

The steam turbine system 16 includes a turbine 48, shaft 50, and load 52 (e.g., electrical generator). As the hot, pressurized steam in line 46 enters the steam turbine 48, the steam contacts turbine blades attached to turbine rotor disks 54 (e.g., turbine stages). As the steam passes through the turbine stages in the turbine 48, the steam induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid. As the pressurized steam in line 46 passes through the turbine 48, the steam loses energy (i.e., expands and cools). After exiting the steam turbine 48, the steam enters a condenser 49 before being routed back to the HRSG 18, where the steam is reheated for reuse in the steam turbine system 16.

As explained above, the controller 12 enables the CCPP 10 to flexibly load the gas turbine system 14, which may enable increased steam production in the HRSG 18. The controller 12 may also be employed to control the temperature of the exhaust gas provided to the HRSG 18.

Generally, the controller 12 may include a memory 56 and a processor 58. The memory 56 stores instructions and steps written in software code as well as data regarding the CCPP 10 and its components. For example, the memory 56 may include instructions and steps for generating a maintenance package for a component or part of the CCPP 10, and the memory 56 may also include stored data regarding operating constraints and/or the history of the CCPP 10 and/or its components. More specifically, the data regarding the history of the CCPP 10 and its components may include data about the maintenance history of the CCPP 10 and/or its components as well as data regarding the operations that the CCPP 10 and its components have ever performed. Additionally, the memory 56 may include stored data regarding the configuration of the CCPP 10 and its components. In other words, the data on the memory 56 may include the layout of the CCPP 10 and its components as well as the arrangement of the components within the CCPP 10. The processor 58 executes the stored instructions in response to feedback from the CCPP 10. For example, as discussed in detail below, the processor 58 may execute the routine for generating and/or updating a maintenance package. More specifically, the controller 12 may control and communicate with various components in the CCPP 10 to flexibly control the loading of the gas turbine system 14, and thus the loading of the steam turbine system 16. The controller 12 may control the airflow control module 20, the intake of fuel 32, and the valve 47. The controller 12 communicates with load 42, exhaust gas temperature sensor 60, HRSG steam temperature sensor 62, and steam turbine metal temperature sensor 64 to load the CCPP 10 along different load paths.

Although the controller 12 has been described as having the memory 56 and the processor 58, the controller 12 may include a number of other computer system components to enable the controller 12 to control the operations of the CCPP 10 and the related components. For example, the controller 12 may include a communication component that enables the controller 12 to communicate with other computing systems. The controller 12 may also include an input/output component that enables the controller 12 to interface with users via a graphical user interface or the like.

As discussed below, it should be noted that in some embodiments, the controller 12 may monitor the CCPP 10 using the sensors 60, 62, and 64 and, via the processor 58, generate a maintenance package partially based on the data from the sensors 60, 62, and 64. Although not shown, other sensors may be placed in other suitable parts of the CCPP 10, and the controller 12 may generate a maintenance package based at least partially on the data from the other sensors.

With the foregoing in mind, the routine for generating and/or updating a maintenance package will now be discussed. As noted above, the routine for generating and/or updating a maintenance package may be stored on the memory 56 and executed by the processor 58 of the controller 12. The routine for generating and/or updating a maintenance package may include instructions that assist the processor 58 to generate a maintenance package that can be implemented on the CCPP 10 or other suitable system.

The processor 58 may receive input from a user regarding operating constraints of the CCPP 10 and/or its components at a present or future time. For example, the operating constraints could include a forecasted mission of the CCPP 10 and/or operating conditions such as power output, fuel consumption, and exhaust airflow. The operating constraints may also include economic considerations, such as the budgets for conducting preventative and corrective maintenance as well as potential lost revenue due to loss of power generation. Furthermore, it should also be noted that the processor 58 may receive data from the sensors 60, 62, and 64 regarding the components of the CCPP 10.

Additionally, in its execution of the routine for generating and/or updating a maintenance package, the processor 58 may use data stored on the memory 56 regarding the CCPP 10 and/or its components. For example, the data could include the maintenance history of the CCPP 10 and/or its components as well as data regarding the operations that the CCPP 10 and its components have performed since last undergoing maintenance. The data could also include the current status of the CCPP 10 and/or its components. For example, the data may reflect the power output of the CCPP 10, the temperatures of or inside various components of the CCPP 10, the fuel consumption of the CCPP 10, and whether the CCPP 10 and its components are operating properly. Furthermore, the data may also include conditions that trigger various alerts, and the processor 58 may determine whether the conditions are still present. The processor 58 can also generate a corresponding alert based on the conditions that have been met.

The data stored on the memory 56 may also include values or ranges of values of typical or expected characteristics of the CCPP 10 based on the operating conditions of the CCPP 10. For example, the memory could include data regarding expected power outputs, pressure of the oxidant in the compressor 22, temperatures inside the combustor 24, temperatures of the turbine 26 and many other characteristics of the components of the CCPP 10 based on the energy being generated by the load 42. The processor 58 may determine whether a current value for a given characteristic is acceptable in comparison to the expected value or range of values, and thereby recognize whether any anomalies exist. Furthermore, the detected alerts and anomalies may be stored on the memory 56. That is, the data of the memory 56 may include the history of the alerts and anomalies associated with the CCPP 10.

Similarly, the data stored on the memory 56 may also include notifications, which may correspond to various ways by which the CCPP 10 may cease to operate properly. In other words, the notifications may correspond to certain undesirable conditions of the CCPP 10 and/or its components. For example, one notification may correspond to overheating in or of the turbine 26. Additionally, the notifications may correspond or relate to the alerts and/or anomalies described above. For example, it could be the case that an alert was previously issued regarding rubbing of one of the rotor disks 38 against the turbine 26 and that at the present time, the CCPP 10 is no longer operating properly. In the instant case, there could be a notification that indicates that the improper operation of the CCPP 10 is due to rubbing of the rotor disk 38. In other words, the notifications may correspond to specific undesirable characteristics or conditions of components of the CCPP 10. Moreover, a notification may correspond to a single sensor reading that is outside of a suitable range of sensor readings, may be triggered by anomalous behavior (i.e. behavior corresponding to an anomaly) or a combination thereof.

The processor 58 may determine the status of the CCPP 10 and its components based on data from the memory and/or data received from the sensors 60, 62, and 64. The processor 58 may then determine whether a notification is present. For example, the processor 58 may receive data from the sensor 60 indicating that the exhaust gas exiting the turbine 26 is undesirable (e.g., above a temperature threshold). As described below, based on the detected notification, the processor 58 may generate a maintenance package for adjusting the operation of the CCPP 10 to reduce the temperature of the exhaust gas.

Figure 2:
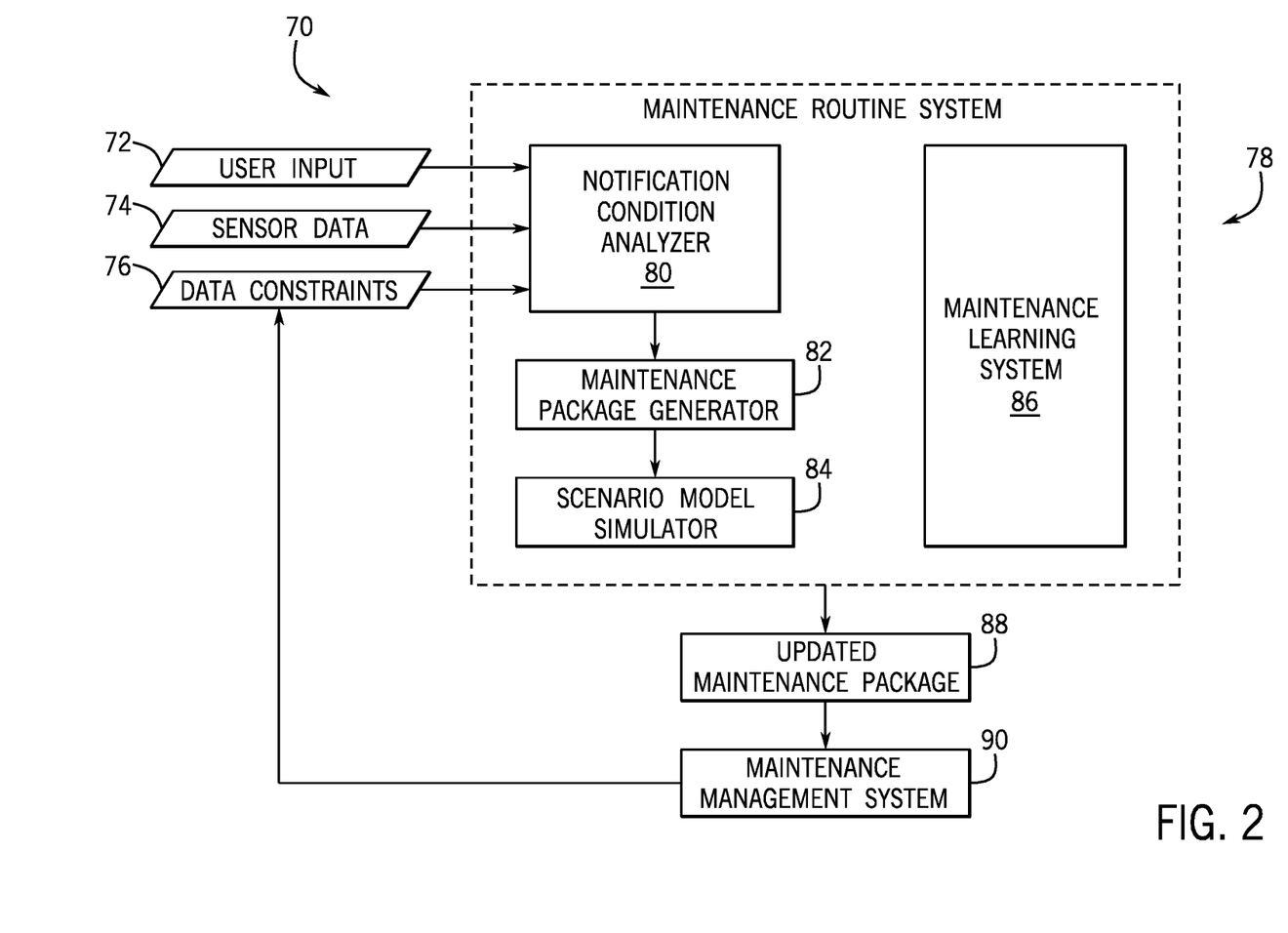
FIG. 2 is a data flow chart for generating a maintenance package, in accordance with embodiments described herein.

With the foregoing in mind, FIG. 2 is a data flow chart 70 of one embodiment in which the controller 12, via the processor 58, may generate a maintenance package. Before discussing the data flow chart 70 in greater detail, it should be noted that the data flow chart 70 may be utilized by any suitable computing device, not just the controller 12. Moreover, although the data flow chart 70 is described as taking place in particular order, it should be understood that the data flow chart 70 may be executed in any suitable order. Additionally, the controller 12, via the memory 56, may include a maintenance routine system 78, the maintenance routine system 78 may include n notification condition analyzer 80, and user input 72, sensor data 74, and data constraints 76 may be received by the maintenance routine system 78 via the notification condition analyzer 80. It should be noted that the maintenance routine system 78 may not be stored on the memory 56 in other embodiments. Instead, the maintenance routine system 78 may be stored elsewhere (e.g., a cloud and/or other memory) and used by the controller 12. As described below the maintenance routine system 78 may, among other things, generate maintenance packages, simulate scenario models of the generated maintenance packages, and compare the scenario models to known or previously utilized maintenance packages.

Referring now to FIG. 2, the notification condition analyzer 80 may receive the user input 72 regarding operating constraints of an industrial asset (e.g., the CCPP 10) and/or its components. The operating constraints may include ranges of values (e.g., temperature, voltage, current, flow, pressure, cost) that correspond to expected operating conditions of various components of the CCPP 10 (e.g., a forecasted mission of the CCPP 10). As discussed above, these constraints may presently exist or may be potentially implemented at a future time. Moreover, the constraints may be based on many factors such as, but not limited to, power output of the CCPP 10 and/or economic considerations (e.g., budgets for preventative and corrective maintenance). For example, the user input 72 may include forecasted operations of the industrial asset, expected penalties associated with when the industrial asset is not operating, and budgets for performing maintenance on the industrial asset. In the example of the CCPP 10, the forecasted operations may include, but are not limited to, power output, the amount of time the CCPP 10 will be generating power, and efficiency.

The penalties associated with when the CCPP 10 is not operating could include a decrease in potential income and the amount of time that the CCPP 10 is not operating. As discussed above, the budgets for performing maintenance may include budgets for preventative and corrective maintenance.

The notification condition analyzer 80 may also receive the sensor data 74. The sensor data may include various information regarding the industrial asset of which the sensors are disposed or associated with. Continuing with the example of the CCPP 10, the sensor data 74 may include temperature data from the sensors 60, 62, and 64. It should be noted, however, that the sensor data 74 may include other types of data. For instance, the CCPP 10 may include other sensors (e.g., pressure sensors), and the other sensors may provide the sensor data 74 to the controller 12.

Additionally, the notification condition analyzer 80 may receive the data constraints 76 of the industrial asset. The data constraints 76 may be stored on the memory 56. The data constraints 76 may include the history of the industrial asset (e.g., operations performed by the industrial asset and maintenance operations performed on the industrial asset), the configuration of the industrial asset, and alerts and/or anomalies. In the example of the CCPP 10, the history of the CCPP 10 may include the operational history of the CCPP 10 since maintenance was last performed on the CCPP 10. For instance, the operational history could include power output, prior sensor data, and when the last maintenance operation was performed. The configuration may include the hardware and software of the CCPP 10. In other words, the configuration may reflect the components of the CCPP 10 and the location of the components within the CCPP 10. The configuration may also reflect the software that is installed on or utilized by the CCPP 10 and the components of the CCPP 10. Furthermore, the alerts and anomalies may be predefined and/or include conditions that may be met in order for a notification to be issued. For example, the memory 56 may contain a set of conditions related to the turbine 26, such as a range of temperatures sensed by the sensor 60. If a temperature is not within the range, then an anomaly may be present. Moreover, the memory 56 may contain instructions to issue an alert when an anomaly in the temperature sensed by the sensor 60 is detected.

Turning now to the maintenance routine system 78, the notification condition analyzer 80 may utilize the sensor data 74 and the data constraints 76 to determine whether any notifications are present. With this in mind, the discussion will now turn to how the notification condition analyzer 80 may make such a determination.

Based on the sensor data 74 and the data constraints 76, the notification condition analyzer 80 may determine a baseline of the industrial asset. The baseline may include the components of the industrial asset and the condition of the components. In other words, determining the baseline may include determining the components of the industrial asset, as well as the conditions of those components. For example, in the context of the CCPP 10, the notification condition analyzer 80 may receive the sensor data 74 and the data constraints 76. The data constraints may include configuration of the CCPP 10, as well as the operational settings of the CCPP 10 and the components of the CCPP 10. The notification condition analyzer 80 may determine or estimate the condition of the components based on the data constraints 76 and the sensor data 74. For instance, a component of the CCPP 10 (e.g., one of the rotor disks 38) may be expected to properly function for a certain amount of time before it may be desirable to replace the component, and the data constraints 76 may include information regarding when the rotor disk 38 was last replaced. Thus, the condition of the rotor disk 38 at a given time may be estimated based on the amount of time that the rotor disk 38 is expected to function properly and the amount of time that has passed since the rotor disk 38 was added to the CCPP 10.

Moreover, the sensor data 74 may also be utilized to estimate the condition of the components of the CCPP 10. For example, a sensor may detect an unfavorable condition (e.g., excessive temperature) that reduces the amount of time a component associated with the sensor is expected to function before being replaced. Based on the sensor data 74, which corresponds to the detected unfavorable condition, and the amount of time the component the component was expected to function properly before being replaced (which can be determined in the manner discussed above in this paragraph), the maintenance routine system 78 may estimate the condition of the component. For example, referring to the CCPP 10, a sensor may detect rubbing of a rotor disk 38 against the turbine 26. However, based on the extent of the rubbing, the turbine 26 or the rotor disk may need to be replaced earlier than previously expected. It may be the case that the rotor disk 38 should be replaced immediately.

The baseline may also include a status of the industrial asset. For instance, the notification condition analyzer 80 may determine a status that reflects that the conditions of a notification are present. Continuing with the example of the CCPP 10, the baseline may include a notification for rubbing of the rotor disks 38 against the turbine 26. More specifically, the notification condition analyzer 80 may determine that predefined conditions for a notification indicative of rubbing of the rotors disks 38 against the turbine 26 are present.

If conditions for at least one notification are present, the notification condition analyzer 80 may map life odometer solutions, condition monitoring solutions, and sensors of the industrial asset based on the notification or notifications that exist. Mapping the life odometer solutions may include determining the life limit of the components of the industrial asset. The life limit refers to the actual and/or expected longevity of a given component. For example, the life limit could be based on the number of times the industrial asset is started and stopped or the amount of time a component of the industrial asset is used. It should also be noted that the life limit could be based on more than one factor. For example, the life limit could be based on both the number of times the industrial asset is stopped and started as well as the amount of time the component is used. A life odometer solution may correspond to a life limit. For example, the life limit solution may note that a certain component may most likely be used another 5,000 hours before it should be serviced or replaced. Furthermore, mapping the life odometer solutions may include determining the life limit of the components of the industrial asset based on an event probability and potential consequence of the event. The event probability may correspond to the likelihood of an undesirable event taking place (e.g., improper functioning a component of the industrial asset), and the potential consequence may be a result of the event occurring or correspond to a probability of the potential consequence occurring if the event occurs. For instance, the potential consequence may be improper or undesirable functioning of the industrial asset caused as a result of an undesirable event taking place. Moreover, it should be noted that there could be any number of life odometer solutions. Thus, the mapping of the life odometer solutions may also include determining and/or compiling all of the individual life odometer solutions of any or all of the components of the industrial asset.

Mapping the condition monitoring solutions may include determining the condition of the industrial asset and/or the condition of the components of the industrial asset. For instance, referring to the example of the CCPP 10, the condition of one rotor disk 38 may not meet a certain desirable condition. A condition monitoring solution based on the condition of the rotor disk 38 may be generated, via the processor 58, based on the condition of the rotor disk 38. For example, in a scenario in which the rotor disk 38 is damaged, the condition monitoring solution may suggest that the sustained damage is life limiting. In other words, the condition monitoring solution may recommend that the CCPP 10 cannot operate properly with the damaged rotor disk 38. However, in another scenario in which the rotor disk 38 may be in a less than desirable condition but may still be used while the CCPP 10 is running, the condition monitoring solution may indicate that the rotor disk 38 could still be used. Moreover, there may be any number of condition monitoring solutions. Thus, the mapping of the condition monitoring solutions may also include determining and/or compiling all of the individual condition monitoring solutions of any or all of the components of the industrial asset.

Mapping the sensors may include determining whether the data from sensors of the industrial asset may reflect or suggest any abnormal or undesirable conditions. Returning to the example of the CCPP 10, it may be the case that the sensor 60 may reflect that the exhaust exiting the turbine 26 has an undesirable temperature. In other words, mapping the sensors may include determining whether any alerts should be or should have been issued and whether any abnormalities are or were present.

Based on the determined notification(s), mapped life odometer solutions, mapped condition monitoring solutions, and mapped sensors, a maintenance package generator 82 may generate an initial maintenance package. The initial maintenance package may include suggested preventative and corrective maintenance schedules and/or operations. For example, in the case of the CCPP 10, if a notification indicative of an undesirable characteristic of one of the rotor disks 38 were present, the maintenance package generator 82 may generate an initial maintenance package suggesting that the rotor disk 38 be repaired or replaced. It should be noted that the initial maintenance package may also suggest actions to take. For instance, returning to the example of the CCPP 10, if the initial maintenance package were to suggest shutting down the CCPP 10 in order to perform a maintenance activity and the user does not wish to shut down the CCPP 10, the initial maintenance package may suggest another course of action (e.g., run the CCPP 10 such that the temperature of the exhaust of turbine 26 is lower). The other course of action may also include performing a different maintenance activity. For example, instead of servicing a damaged component, the other course of action may suggest replacing the component. Additionally, as discussed below, the initial maintenance package may include several types of outages for the industrial asset. For instance, the initial maintenance package could recommend shutting down the industrial asset at a certain time in the future in order to perform maintenance activities.

Furthermore, the initial maintenance package may include an equipment configuration. The equipment configuration may include changes to the configuration of the industrial asset that may improve the likelihood of reducing the number or cost of future maintenance activities. For instance, in the example of the CCPP 10, the equipment configuration may include adding a sensor in order to provide more data regarding a component of the CCPP 10 (e.g., the compressor 22, the combustor 24, or the turbine 26). The additional data provided by the added sensor may allow for earlier detection of anomalies, and earlier detection of anomalies may result in earlier detection of notifications. Earlier detection of notifications may reduce the costs of maintenance associated with the notifications. Additionally, the equipment configuration may include operational settings of the components of the industrial asset that may extend the expected life limit of the components. In the case of the CCPP 10, the equipment configuration may include, among other things, changing operating settings related to the turbine 26 in order to reduce the temperature of the exhaust that exits the turbine. As another example, the equipment configuration may include operating settings that reduce the rate at which the rotor disks 38 operate.

A scenario model simulator 84 may receive the initial maintenance package generated by the maintenance package generator 82. The scenario model simulator 84 may also simulate the effect of using the initial maintenance package. For example, the scenario model simulator 84 may evaluate the potential result of performing the initial maintenance package. In other words, the initial maintenance package could recommend a certain course of action, and the scenario model simulator 84 may simulate what effect performing the initial maintenance package would have on the industrial asset and the components of the industrial asset.

More specifically, the memory 56 may contain data representative of the industrial asset, such as a virtual model of the industrial asset. When a notification is determined, the conditions (e.g., sensors data) associated with the notification may be incorporated into the virtual model of the industrial asset. Furthermore, the initial maintenance package from the maintenance package generator 82 may be simulated in the virtual model of the industrial asset via the scenario model simulator 84. Thus, the scenario model of the initial maintenance package may include an expected outcome of performing the initial maintenance package. In other words, by implementing the initial maintenance package on the virtual model of the industrial asset, the scenario model simulator 84 may generate a scenario model that reflects the expected effect the initial maintenance package will have on the industrial asset and its components. For example, the scenario model could be used to determine whether the initial maintenance package will likely or actually remedy an issue associated with the industrial asset or its components, and the scenario model may also reflect the expected changes to characteristics or qualities of the industrial asset (e.g., efficiency). Furthermore, the scenario model of the initial maintenance package may also simulate other factors related to the industrial asset. For example, the scenario model may be used to model the approximate cost to perform the initial maintenance package.

The scenario model simulator 84 may also simulate the initial maintenance package based on other industrial assets and/or the maintenance histories of the other industrial assets. For instance, with the example of the CCPP 10 in mind, the scenario model simulator 84 may simulate the effect of implementing the initial maintenance package on the CCPP 10 by simulating the effect of implementing the maintenance package on a different power plant. Additionally, a simulation of the initial maintenance package on the other power plant may take into consideration the maintenance history of the other power plant. For example, it may be the case the notification present in the CCPP 10 was previously present in the other power plant. The scenario model simulator 84 may then use data (e.g., from the memory 56) what was done to the other power plant (e.g., a maintenance activity), in its simulation of the scenario model of implementing the initial maintenance package in the CCPP 10.

The scenario model generated by the scenario model simulator 84 may be received by a maintenance learning system 86. Based on the user input 72 and the data constraints 76, the maintenance learning system 86 may check the scenario model to determine whether the scenario model may be changed to better conform to the user input 72 and data constraints 76. For instance, the scenario model generated by the scenario model simulator 84 may suggest that the initial maintenance package includes a maintenance activity that conflicts with the user input 72. An example of this may be that the scenario model suggests a preventative maintenance operation that will exceed the preventative maintenance budget. Moreover, the maintenance learning system 86 may determine whether more initial maintenance packages should be generated by the maintenance package generator 82. For example, the scenario model of the initial maintenance package received by the maintenance learning system 86 may accord with the user input 72 and the data constraints 76, but it may be possible that another initial maintenance package may be more suitable. For instance, it may be possible that another initial maintenance package would have the same effect as the initial maintenance package but increase the efficiency of the industrial asset and/or suggest a maintenance operation that is less costly and/or can be performed in less time than the initial maintenance package. As such, the maintenance learning system 86 may send a command to the maintenance package generator 82 to generate another initial maintenance package, which may subsequently be simulated by the scenario model simulator 84 and checked by the maintenance learning system 86. This cycle may repeat a number of times until the scenario model simulator 84 produces results within a desired threshold.

Similar to the scenario model simulator 84, the maintenance learning system 86 may also check the scenario model of the initial maintenance package against other industrial assets and/or the maintenance histories of the other industrial assets. For instance, the maintenance learning system 86 may compare the scenario model of the initial maintenance package with the same or a similar maintenance package that was performed on another industrial asset to determine the validity of the scenario model. For example, in the case of the CCPP 10, the maintenance learning system 86 may compare the scenario model to a maintenance package that was performed on another power plant and determine the likely accuracy of the scenario model. For instance, the maintenance learning system 86 may determine that the maintenance costs predicted in the scenario model are inaccurate based on the known cost of the maintenance package previously performed on the other power plant. As a further example, the maintenance learning system 86 may determine that the scenario model is accurate in its predicted effect of performing the initial maintenance package (i.e., determining whether performing the initial maintenance package will make the expected change(s) to the CCPP 10).

Moreover, the maintenance learning system 86 may compare the scenario model generated by the scenario model simulator 84 to data regarding other industrial assets in order to determine the validity of the notification generated by the notification condition analyzer 80. In the case of the CCPP 10, the maintenance learning system 86 may read in data (e.g., from the memory 56) regarding notifications issued by other power plants, sensor data from other power plants, and the maintenance history of the other power plants. The maintenance learning system 86 may compare the scenario model to the actual data from the other plants to verify the validity of the notification present in the CCPP 10. For example, it may be the case in another power plant that sensor data similar to the sensor data 74 was recorded, yet a different notification was determined to be present. The maintenance learning system 86 may send a command to the notification condition analyzer 80 to reexamine if the originally determined notification and/or another notification is present. The notification condition analyzer 80 may make this determination, the maintenance package generator 82 may generate an initial maintenance package based on the notification determined to be present, the scenario model simulator 84 may simulate the initial maintenance package to generate a scenario model, and the scenario model may be further examined by the maintenance learning system 86. All of these tasks may be performed in the manner described above. Such a cycle may be repeated any number of times.

The maintenance routine system 78 may determine an updated maintenance package 88. The updated maintenance package 88 may contain the information of an initial maintenance package generated by the maintenance package generator 82 as described above. The updated maintenance package 88 may be the initial maintenance package that has been modified or the updated maintenance package 88 may be different maintenance package. More specifically, the updated maintenance package 88 may be an initial maintenance package generated by the maintenance package generator 82 that has subsequently been simulated by the scenario model simulator 84 and checked by the maintenance learning system 86. Thus, the updated maintenance package 88 may include suggested preventative and corrective maintenance schedules and/or operations, actions to take (e.g., run the CCPP 10 such that the temperature of the exhaust of turbine 26 is lower), outages for the industrial asset, and an equipment configuration. It should be noted that the updated maintenance package 88 may be a maintenance package that meets the constraints of the user input 72 and the data constraints 76 and corresponds to the sensor data 74. Thus, the updated maintenance package 88 may be a maintenance package that, if performed, may allow the industrial asset to perform the forecasted operations, have a lower potential loss of income due to downtime in comparison to other maintenance packages, and have a maintenance schedule that is less than or equal to the preventative maintenance and corrective maintenance budgets. Additionally, the maintenance schedule of the updated maintenance package 88 may include maintenance operations that are more cost effective to perform than maintenance operations of other maintenance packages, yet the updated maintenance package 88, if performed, may also extend the predicted life limit of the components of the industrial asset.

Furthermore, the updated maintenance package 88 may be output or displayed to a user, for example, via a graphical user interface or display associated with the industrial asset (e.g., the controller 12 or the CCPP 10). Additionally, the updated maintenance package 88 may be displayed in various formats. For example, the updated maintenance package 88 may include letters or numbers. In other words, the updated maintenance package 88 may include words or sentences that detail what the updated maintenance package 88 is and/or includes. For example, the updated maintenance package 88 could be displayed as sentences detailing the steps that should be taken by the user to perform the updated maintenance package 88, and those steps could include numbers (e.g., numeric values related to settings of the components of the CCPP 10). As a further example of how the updated maintenance package 88 may be displayed, the updated maintenance package 88 may also include gauges or color shading or color gradations, or any combination thereof. For example, the updated maintenance package 88 could display a gauge that reflects a characteristic of a component of the CCPP 10 (e.g., percentage of expected life limit of a component of the CCPP 10 that has been used or remains). Similarly, color shading or color gradations may also be used. For example, colors may be used to notify the user of the components for which a notification has been determined to exist. For instance, if a notification associated with the turbine 26 is determined to exist, the displayed updated maintenance package 88 could include a digital representation of the CCPP 10, and the turbine 26 may be represented in a different color than the other components of the CCPP 10. Color gradations may also be used. For example, the displayed updated maintenance package 88 may include digital representation of the CCPP 10, and each component of the CCPP 10 may be presented in a shade of a color that is representative of a characteristic of each feature (e.g., shades of a color reflective of remaining time before expected life limit is reached or maintenance should be performed).

A maintenance management system 90 may receive the updated maintenance package 88, and the maintenance management system 90 may implement at least some of the updated maintenance package 88 on the industrial asset. Moreover, the maintenance management system 90 may also track updated maintenance packages 88. In other words, the maintenance management system 90 may determine the extent to which the updated maintenance package 88 has been performed. The maintenance management system 90 may display information about the updated maintenance package and/or the status of the implementation of the updated maintenance package in the same ways as discussed above in relation to how the updated maintenance package may be displayed. Additionally, the maintenance management system 90 may generate and display notices based on the life odometer solutions, condition monitoring solutions, the sensor data 74 or a combination thereof. For example, the maintenance management system 90 may generate a notice based on the life odometer solutions that a new maintenance package should be generated. Moreover, the maintenance management system 90 may be a program executable by the controller 12 or a computer. The maintenance management system 90 may be stored on the memory 56 or in another suitable location (e.g., another memory).

Furthermore, the maintenance management system 90 may send data related to the updated maintenance package 88 to be included in the data constraints 76. For example, the maintenance management system 90 may send data that includes information regarding the updated maintenance package 88 and/or the status of the implementation of the updated maintenance package 88 to the memory 56, which may then store the data with the data constraints 76. As a further example, once the maintenance operations or maintenance schedule of the updated maintenance package 88 has been performed, the data constraints 76 may reflect when the maintenance operations or maintenance schedule was performed. Thus, the operations done since the last maintenance operation, which as discussed above may be included in the data constraints 76, may reflect the operations performed since the maintenance operations or the maintenance schedule of the updated maintenance package 88 was performed.

It is to be appreciated that the updated maintenance package 88 may be modified and/or another updated maintenance package 88 may be generated based on changes to the user input 72, the sensor data 74, and the data constraints 76. In other words, the maintenance routine system 78 may dynamically change or replace the updated maintenance package 88 in response to changes in the user input 72, the sensor data 74, and the data constraints 76. Going back to the example of the CCPP 10, the updated maintenance package 88 may have included specific maintenance activities, and the maintenance activities may have been performed. Subsequent to the performance of the maintenance activities, the sensor data 74 may change (i.e., the sensor 60 may reflect an undesirable temperature whereas the sensor 60 has previously reflected that the temperature was suitable). Following along FIG. 2 as described above, the maintenance routine system 78 may then determine and output another (i.e., a second) updated maintenance package 88 and/or modify the updated maintenance package 88 based in part on the sensor data 74. Additionally, the updated maintenance package 88, as modified, or the second preferred maintenance package 88 may subsequently be sent to the maintenance management system 90, which may then carry out the tasks associated with the maintenance management system 90 described above. Thus, the maintenance routine system 78 may continuously and dynamically modify an existing updated maintenance package or generate a new updated maintenance package based on changes to the user input 72, the sensor data 74, or the data constraints 76.

It should also be noted that the updated maintenance package 88 may be modified and/or another updated maintenance package 88 may be generated based on changes to the user input 72, the sensor data 74, and the data constraints 76 even when a notification is not present. For instance, a user may change the user input 72 to reflect different forecasted operations of the industrial asset or a different budget for preventative and/or corrective maintenance. In such a case, the updated maintenance package 88 may be modified and/or another updated maintenance package may be generated. For example, in the case of the CCPP 10, the user input 72 may be changed to include a desired power output that is higher than the power output originally included in the user input 72, and the updated maintenance package 88 may be updated or replaced. For instance, the originally updated maintenance package 88 may be treated as an initial maintenance package generated by the maintenance package generator 82. The original updated maintenance package 88 may then be simulated by the scenario model simulator 84 to generate a scenario model. The scenario model may be checked by the maintenance learning system 86, which may recognize that the user input 72 has changed. Thus, as described above, the maintenance learning system 86 may send a command to the maintenance package generator 82 to generate an initial maintenance package. Such a process, or any process described above in relation to the maintenance routine system 78, may be carried out until a new or modified updated maintenance package 88 is generated.

Figure 3:
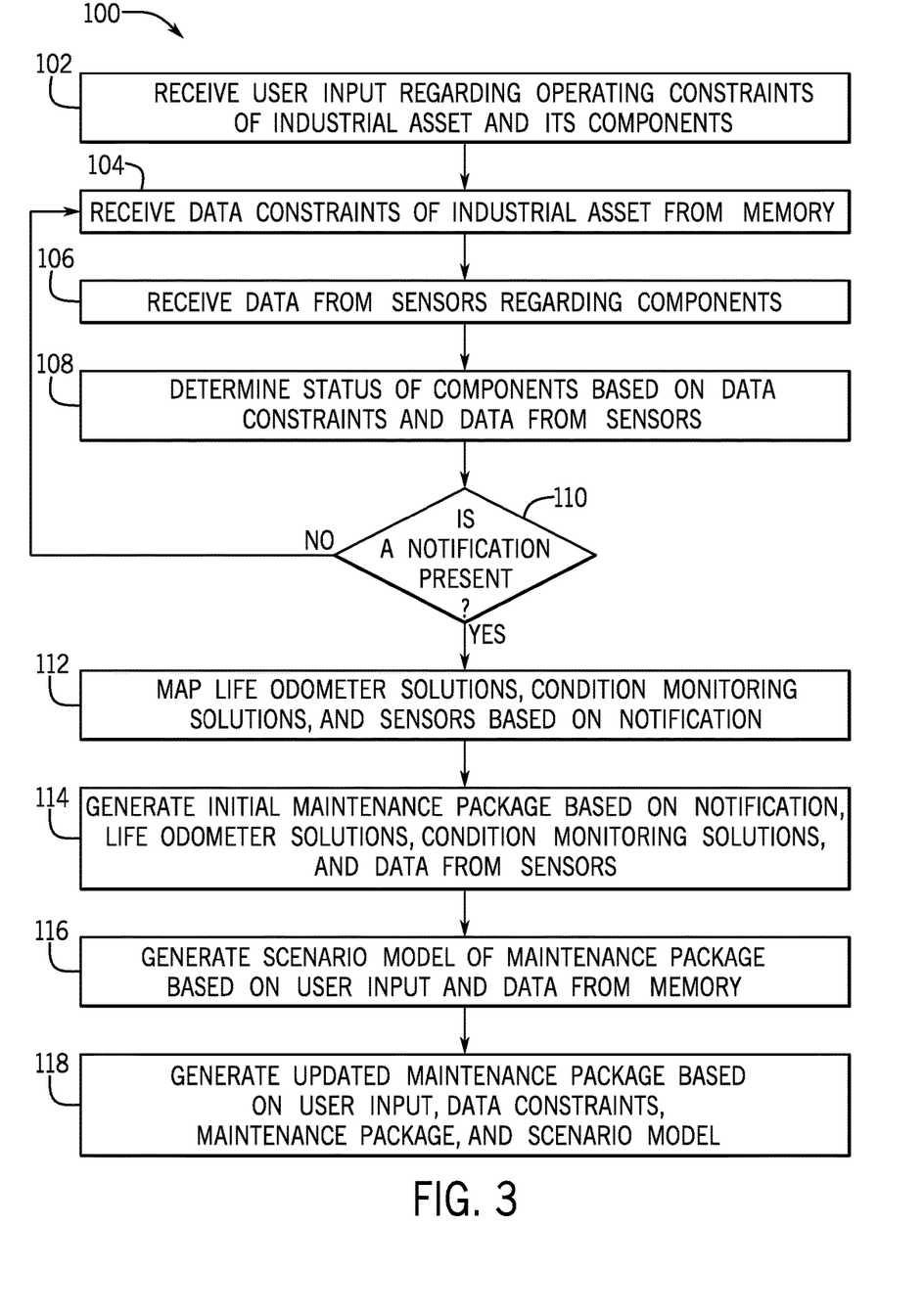
FIG. 3 is a flow chart of a method for generating an updated maintenance package, in accordance with embodiments described herein.

With the foregoing in mind, FIG. 3 illustrates a method 100 for generating an updated maintenance package 88 that will now be described. Although the following description of the method 100 will be discussed as being performed by the controller 12, it should be noted that the method 100 may be performed by any suitable computing device. Moreover, although the method 100 is described as being performed in a particular order, it should be understood that the method 100 may be performed in any suitable order. It should also be emphasized that although the following discussion of the method 100 is in relation to the CCPP 10, the method 100 may be performed on a variety of other systems.

Referring now to FIG. 3, at block 102, the controller 12 may receive user input regarding operating constraints of the CCPP 10 and/or its components. The operating constraints may include ranges of values (e.g., temperature, voltage, current, flow, pressure) that correspond to expected operating conditions of various components of the CCPP 10. As discussed above, these constraints may presently exist or may be potentially implemented at a future time. Moreover, the constraints may be based on a plethora of factors such as power output of the CCPP 10 and/or economic considerations (e.g., budgets for preventative and corrective maintenance).

At block 104, the controller 12 may receive data constraints from the memory 56 regarding the CCPP 10 and its components. As discussed above, the data may include the maintenance history of the CCPP 10 and/or its components. Additionally, the data may include information regarding the operations that the CCPP 10 and its components have performed since last undergoing maintenance and whether any alerts or anomalies have been issued or detected since the previous maintenance operation. The data may also include information regarding a prior status of the CCPP 10 or its components.

Additionally, at block 106, the processor 58 may receive data from the sensors 60, 62, and 64 regarding components of the CCPP 10. The data from the sensors 60, 62, and 64 may provide details with regard to the current operating conditions of the respective components.

At block 108, the controller 12 may determine the status of the components of the CCPP 10 and the CCPP 10 based on the data from the memory 56 and the data from the sensors 60, 62, and 64. For example, as described above, the controller 12 may determine that the CCPP 10 and all of its components are operating properly. Additionally, the controller 12 may determine that the CCPP 10 is not running properly or as desired. As a further example, a sensor may detect an unfavorable condition that reduces the expected life limit of a rotor disk 38. Based on the data from the sensor, which corresponds to the detected unfavorable condition, and the expected life limit of the rotor disk 38 before the unfavorable condition occurred (which may be included in the data stored on the memory 56), a new life limit, which reflects the condition of the rotor disk 38, may be determined. For example, the data from the sensor may reflect that the rotor disk has undergone damage and that before the damage occurred, the life limit was 5,000 hours. Depending on the severity of the damage, the new life limit may be an amount of time less than 5,000 hours.

After determining the status of the components, at block 110, the controller 12 may determine whether a notification is present based on the status of the components. For example, if the CCPP 10 and all of its components are operating properly and/or as desired, then the processor 58 may determine that no notification is present. If the controller 12 determines that the notification is not present, the controller 12 may return to block 104 and continue to receive data from the memory 56 regarding the status of the CCPP 10 and/or its components.

However, based on the status of the components, the controller 12 may determine a notification is present. As discussed above, the notification may be specific to one or more components of the CCPP 10. For example, there may be an notification indicating that the turbine 26 or one of the rotor disks 38 is not operating properly (e.g., overheating or rubbing exists).

If the controller 12 determines a notification is present, at block 112, the controller 12, via the processor 58, may map life odometer solutions, condition monitoring solutions, and the sensors 60, 62, and 64 based on the determined notification. Mapping the life odometer solutions may include determining the life limit of the components of the CCPP 10. The life limit refers to the actual and/or expected longevity of a given component. For example, the life limit could be based on the number of times the CCPP 10 is started and stopped or the amount of time the component is used. It should also be noted that the life limit could be based on more than one factor. For example, the life limit could be based on both the number of times the CCPP 10 is stopped and started as well as the amount of time the component is used. A life odometer solution may correspond to a life limit. For example, the life limit solution may note that a certain component may most likely be used another 5,000 hours before it needs to be serviced or replaced. Moreover, it should be noted that there could be any number of life odometer solutions. Thus, the mapping of the life odometer solutions may also include determining and/or compiling all of the individual life odometer solutions of any or all of the components of the CCPP 10.

Mapping the condition monitoring solutions may include determining the condition of the CCPP 10 and/or its components. For instance, the condition of one rotor disk 38 may not meet a certain desirable condition. A condition monitoring solution based on the condition of the rotor disk 38 may be generated, via the processor 58, based on the condition of the rotor disk 38. For example, in a scenario in which the rotor disk 38 is damaged, the condition monitoring solution may suggest that the sustained damage is life limiting. In other words, the condition monitoring solution may recommend that the CCPP 10 cannot operate properly with the damaged rotor disk 38. However, in another scenario in which the rotor disk 38 may be in a less than desirable condition but may still be used while the CCPP 10 is running, the condition monitoring solution may reflect that the rotor disk 38 could still be used. Moreover, it there may be any number of condition monitoring solutions. Thus, the mapping of the condition monitoring solutions may also include determining and/or compiling all of the individual condition monitoring solutions of any or all of the components of the CCPP 10.

Mapping the sensors may include determining whether the data from the sensors 60, 62, and 64 may reflect or suggest any abnormal or undesirable conditions. For example, the sensor 60 may reflect that the exhaust exiting the turbine 26 has an undesirable temperature. In other words, mapping the sensors may include determining whether any alerts should be or should have been issued and whether any abnormalities are or were present.

As an example to further demonstrate what may occur at block 112, consider a scenario in which at a determined notification reflects that at least one of the rotor disks 54 has an undesirable condition due to an unsuitable temperature within the turbine 48. A life odometer solution may reflect how much longer each of the rotor disks 54 can be expected to be used before needing to be replaced. A condition monitoring solution may reflect that some of the rotors disks 54 are in good condition but that at least one of the rotor disks 54 has life limiting damage (e.g., one of the rotor disks 54 should not be used more than a certain amount of time before being replaced). The mapping of the sensors 60, 62, and 64 may reflect that the turbine 48 has been operating at too high of a temperature.

Based on the life odometer solutions, the condition monitoring solutions, and the data from the sensors, at block 114, the controller 12, via the processor 58, may generate an initial maintenance package. The initial maintenance package may include suggested preventative and corrective maintenance schedules and/or operations. Continuing with the example of the rotor disk 54 from above, the initial maintenance package may include specific maintenance tasks that should be performed such that, once performed, the notification will be no longer present. The initial maintenance package may also direct a user as to when the next preventative maintenance should be carried out on any of the components of the CCPP 10, including the turbine 48 and/or the rotor disks 54.

The initial maintenance package may also suggest actions to take. For example, if the initial maintenance package suggests shutting down the CCPP 10 in order to perform a maintenance activity and the user does not wish to shut down the CCPP 10, the initial maintenance package may suggest another course of action (e.g., run the CCPP 10 such that the temperature of the exhaust of turbine 26 is lower). The other course of action could also include performing a different maintenance activity. For example, instead of servicing a damaged component, the other course of action may suggest replacing the component.

Additionally, the initial maintenance package may include several types of outages for the CCPP 10. For example, the initial maintenance package could include a planned outage, a maintenance outage, or a forced outage. A planned outage may be suggested for many reasons, including performing diagnostics related to the notification. For example, if a general notification is determined to be present (e.g., a notification specific to the turbine 26 instead of one specific to one of the rotor disks 38), the initial maintenance package may suggest scheduling a planned outage during which workers may determine the specific cause as to why the notification is present. A maintenance outage may be suggested, during which workers will perform suggested maintenance activities. For example, the initial maintenance package may recommend scheduling routine maintenance at a given time in the future during which time the initial maintenance package recommends making a repair. A forced outage may be an outage due to an unscheduled interruption in the power generation of the CCPP 10. For example, a component of the CCPP 10 may unexpectedly cease operating, causing the CCPP 10 to stop operating, and hence, cause a forced outage. The initial maintenance package may be based on n notification that is present due to a forced outage.

Based on the generated initial maintenance package, the data from the memory 56, and the user input, at block 116, the controller 12 may generate a scenario model of the initial maintenance package. More specifically, the scenario model of the initial maintenance package may be used to determine or evaluate a potential result of performing the initial maintenance package and/or other related information. For example, the initial maintenance package could recommend a certain course of action, and the scenario model of the initial maintenance package may simulate what effect performing the initial maintenance package would have on the CCPP 10 and its components. More specifically, the memory 56 may contain stored data representative of the CCPP 10, such as a virtual model of the CCPP 10. When n notification is determined, the notification may be incorporated into the virtual model of the CCPP 10. Furthermore, the generated initial maintenance package may be simulated in the virtual model of the CCPP 10. Thus, the scenario model of the initial maintenance package may include an expected outcome of performing the initial maintenance package. In other words, by implementing the initial maintenance package on the virtual model of the CCPP 10, the controller 12, via the processor 58, may generate a scenario model that reflects the expected effect the initial maintenance package will have on the CCPP 10 and its components. For example, the scenario model could be used to determine whether the initial maintenance package will likely or actually remedy an issue associated with the CCPP 10 or its components, and the scenario model may also reflect the expected changes to characteristics or qualities of the CCPP 10 (e.g., efficiency, power output, etc.). Furthermore, the scenario model of the initial maintenance package may also simulate other factors related to the CCPP 10. For example, the initial scenario model may be used to model the approximate cost to perform the maintenance package.

Moreover, the scenario modeling of the initial maintenance package may incorporate operational data and/or components of other power plants. For example, the memory 56 may contain data regarding other power plants, maintenance packages performed at the other power plants, and the result of the maintenance packages implemented at the other power plants (e.g., whether an notification was eliminated, cost, power output, downtime, etc.). In addition to the factors described above, the scenario modeling may also include modeling based on the other power plants. For example, if the initial maintenance package recommended replacing a rotor disk 54, the scenario modeling of the initial maintenance package could include determining whether the rotor disk 54 of another turbine 48 in another power plant had been replaced, and then base a cost estimate and/or downtime needed to perform the maintenance on the cost of replacing and time needed to replace the rotor disk 54.

Based on the user input, the data constraints, the initial maintenance package, and the scenario model of the initial maintenance package, at block 118, the controller 12 may generate an updated maintenance package 88. The updated maintenance package 88 may be generated after the scenario model of the initial maintenance package is further analyzed or checked by the controller 12. The controller 12 may analyze or check the scenario model as a function of many factors, including but not limited to, budgets for maintenance, expected lost revenue from loss of power generation, the amount of time that has passes since the last performed maintenance, and downtime. Moreover, the many factors may also be assigned different weights. In other words, some factors may be given more importance than others.

Moreover, as discussed above, the updated maintenance package 88 may include any of the features or details discussed above in relation to initial maintenance packages. Thus, the updated maintenance package 88 may include suggested preventative and corrective maintenance schedules and/or operations such as specific maintenance tasks that should be performed, when the next preventative maintenance should be carried out on any of the components of the CCPP 10, and actions to take (e.g., shut down the CCPP 10 or replace a component of the CCPP 10).

It should be noted that the more than one notification may be determined to exist. In such an event, the life odometer solutions, condition monitoring solutions, and the sensors 60, 62, and 64 may be mapped based on the more than one notifications. Additionally, a maintenance package may be based on more than one notification.

It should also be noted that any examples given are only given to illustrate the abilities of the routine for generating and/or updating a maintenance package. The routine for generating and/or updating a maintenance package is not limited to the examples discussed above. Furthermore, while the various operations described at each of the steps (blocks 102-118) may reference specific components or parts of the CCPP 10 based on a determined notification, the operations may be done on any component of the CCPP 10. For example, in the event n notification regarding the rotor disk 54 is determined, mapping the life odometer solutions, condition monitoring solutions, and the sensors 60, 62, and 64 may include mapping related to components of the CCPP 10 other than the rotor disk 54. In other words, although n notification may correspond to a specific component of the CCPP 10, the life odometer solutions, condition monitoring solutions, and other sensors 60, 62, and 64 may be mapped.

Additionally, although not shown, other sensors may be placed in or on other suitable areas or parts of the CCPP 10, and the controller 12 may generate an initial maintenance package and/or an updated maintenance package 88 at least partially based on the data from the other sensors. For example, while sensors 60, 62, and 64 are temperature sensors, another sensor could be used to monitor the pressure inside a component (e.g., the compressor 22) or for any other purpose that a user finds suitable or desirable. An initial maintenance package and/or an updated maintenance package 88 that incorporates data from the other sensor(s) may then be generated.

As can be appreciated by those skilled in the art, the routine for generating and/or updating a maintenance package discussed above may be used in conjunction with or applied to any other system or industrial asset that may undergo maintenance such as, but not limited to, an automobile, an aircraft, an assembly line, or a factory. In other words, the routine for generating and/or updating a maintenance package is not limited or restricted to being used in relation to a power plant system or the CCPP 10. Moreover, the routine for generating and/or updating a maintenance package may be executed by any suitable computing device. In other words, the routine for generating and/or updating a maintenance package may be carried out using a processor and memory that are separate from the controller 12.

Technical effects of the presently disclosed systems and techniques include generating maintenance packages of maintenance operations to be performed on the CCPP 10 or other suitable industrial equipment. Moreover, providing a maintenance package, the controller 12 may enhance the performance of the CCPP 10, reduce the downtime of the CCPP 10 used to perform maintenance, or the like. That is, the amount of maintenance operations and time spent performing maintenance on the CCPP 10 may be reduced and the life the CCPP 10 or other suitable system may be extended as a result of the following the maintenance package.

This written description uses examples to disclose various embodiments of the presently disclosed systems and techniques, including the best mode, and to enable any person skilled in the art to practice the embodiments, including making and using any devices or systems and performing any incorporated methods. The patentable scope of the presently disclosed systems and techniques is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power plant system, comprising:
   a turbine system;
   a sensor configured to collect a first set of data regarding the turbine system;
   a controller comprising a processor, wherein the controller, via the processor, is configured to:
   receive one or more operating constraints of the turbine system via user input, a second set of data regarding the turbine system from memory, and the first set of data from the sensor;
   determine whether a first alarm condition is present based on whether the first set of data exceeds a threshold, wherein the first alarm condition is indicative of the turbine system being in need of a maintenance operation;
   map one or more life odometer solutions, one or more condition monitoring solutions, and the sensor based on the first alarm condition being present, wherein the life odometer solutions comprise an expected amount of time before one or more components of the turbine system are scheduled to be serviced or replaced, wherein the condition monitoring solutions comprise one or more expected conditions of the one or more components based on the first alarm condition being present, and wherein the one or more components is associated with the first alarm condition;
   generate a first maintenance package in response to the first alarm condition being present, wherein the first maintenance package is generated based on the one or more components, the life odometer solutions, the condition monitoring solutions, and the first set of data, wherein the first maintenance package comprises one or more maintenance activities to be performed for the one or more components over a period of time;
   generate a model of implementing the first maintenance package with respect to the turbine system based on the one or more operating constraints of the turbine system, the second set of data, and the first maintenance package; and
   generate a second maintenance package based on the one or more operating constraints of the turbine system, the second set of data, the first maintenance package, and the model, wherein the second maintenance package comprises one or more operations to perform to address the first alarm condition and one or more preventative actions to perform over a period of time.

2. The power plant system of claim 1, wherein the first maintenance package or the second maintenance package comprises a maintenance schedule, an operational setting of the power plant system, or a change to a configuration of the turbine system.

3. The power plant system of claim 1, wherein the controller, via the processor, is configured to determine whether implementing the first maintenance package with respect to the turbine system will remove the first alarm condition based on the model.

4. The power plant system of claim 3, wherein the controller, via the processor, is configured to:
   compare the model to a maintenance history of a second turbine system, wherein the maintenance history comprises at least one maintenance operation performed on the second turbine system; and
   determine whether implementing the first maintenance package with respect to the turbine system will remove the first alarm condition based on the maintenance history of the second turbine system.

5. The power plant system of claim 1, comprising a maintenance management system, wherein the maintenance management system is configured to implement at least a portion of the second maintenance package with respect to the turbine system or determine an extent to which the second maintenance package has been implemented with regard to the turbine system.

6. The power plant system of claim 1, wherein the second maintenance package is the same as the first maintenance package.

7. The power plant system of claim 1, wherein the second maintenance package comprises a maintenance schedule indicating a plurality of times when the one or more preventative actions should be performed, wherein the plurality of times are determined based on the one or more operations to perform to address the first alarm condition.

8. The power plant system of claim 1, wherein the controller, via the processor, is configured to generate the first maintenance package based at least partially on a second alarm condition being present, wherein the second alarm condition is present at the same time as the first alarm condition.

9. The power plant system of claim 1, wherein the second maintenance package, when implemented, is configured to adjust the first set of data to be within a first threshold, adjust the second set of data to be within a second threshold, or any combination thereof.

10. The power plant system of claim 1, wherein the controller, via the processor, is configured to:
    receive a second user input, wherein the second user input is indicative of a change to the one or more operating constraints of the turbine system; and
    generate a third maintenance package based at least partially on the second user input.

11. A method, comprising:
    receiving, via a processor, one or more operating constraints of an industrial asset via user input, a first set of data regarding the industrial asset, and a second set of data from at least one sensor, wherein the second set of data corresponds to a characteristic of the industrial asset;
    determining, via the processor, whether an alarm condition is present based on the whether the first set of data exceeds a threshold, wherein the first alarm condition is indicative of the industrial asset being in need of a maintenance operation;
    mapping, via the processor, one or more life odometer solutions, one or more condition monitoring solutions, and the at least one sensor based on the alarm condition being present, wherein mapping the life odometer solutions comprises determining an expected amount of time before one or more components of the industrial asset are to be serviced or replaced, wherein mapping the condition monitoring solutions comprises determining one or more expected conditions of the one or more components based on the first alarm condition being present, and wherein the one or more components is associated with the first alarm condition;
    generating, via the processor, a first maintenance package in response to the first alarm condition being present, wherein the first maintenance package is generated based on the one or more components, the life odometer solutions, the condition monitoring solutions, and the second set of data, wherein the first maintenance package comprises one or more maintenance activities to be performed for the one or more components over a period of time;

generating, via the processor, a model of implementing the first maintenance package with respect to the industrial asset based on the one or more operating constraints of the industrial asset, the first set of data, and the first maintenance package; and generating, via the processor, a second maintenance package based on the one or more operating constraints of the industrial asset, the first set of data, the first maintenance package, and the model, wherein the second maintenance package comprises one or more operations to perform to address the first alarm condition and one or more preventative actions to perform over a period of time.

12. The method of claim 11, comprising determining, via the processor, whether implementing the first maintenance package with respect to the industrial asset will remove the first alarm condition based on the model.

13. The method of claim 11, wherein the second maintenance package is the same as the first maintenance package.

14. The method of claim 11, comprising generating, via the processor, a second model of implementing the first maintenance package with respect to a second industrial asset.

15. The method of claim 11, wherein the one or more operating constraints of the industrial asset comprises a maintenance budget, and wherein the second maintenance package is predicted to use less of the maintenance budget based on the model and on a second model of the second maintenance package.

16. A non-transitory machine readable medium, comprising computer executable instructions configured to cause a processor to:
receive one or more operating constraints of an industrial asset via user input, a first set of data regarding the industrial asset, and a second set of data from at least one sensor, wherein the second set of data corresponds to a characteristic of the industrial asset;
determine whether a first alarm condition is present based on whether the first set of data exceeds a threshold, wherein the first alarm condition is indicative of the industrial asset being in need of a maintenance operation;
map one or more life odometer solutions, one or more condition monitoring solutions, and the at least one sensor based on the first alarm condition being present, wherein the life odometer solutions comprise an expected amount of time before one or more components of the industrial asset are to be serviced or replaced, wherein the condition monitoring solutions comprise one or more expected conditions of the one or more components based on the first alarm condition being present, and wherein the one or more components is associated with the first alarm condition;

generate a first maintenance package in response to the first alarm condition being present, wherein the first maintenance package is generated based on the one or more components, the life odometer solutions, the condition monitoring solutions, and the second set of data, wherein the first maintenance package comprises one or more maintenance activities to be performed for the one or more components over a period of time;

generate a model of implementing the first maintenance package with respect to the industrial asset based on the one or more operating constraints of the industrial asset, the first set of data, and the first maintenance package; and generate a second maintenance package based on the one or more operating constraints of the industrial asset, the first set of data, the first maintenance package, and the model, wherein the second maintenance package comprises one or more operations to perform to address the first alarm condition and one or more preventative actions to perform over a period of time.

17. The non-transitory machine readable medium of claim 16, wherein the computer executable instructions are configured to cause the processor to determine whether implementing the first maintenance package with respect to the industrial asset will remove the first alarm condition based on the model.

18. The non-transitory machine readable medium of claim 16, wherein the second maintenance package comprises a planned outage, a maintenance outage, or a forced outage for the industrial asset.

19. The non-transitory machine readable medium of claim 16, wherein the first set of data comprises a maintenance history of the industrial asset.

20. The non-transitory machine readable medium of claim 16, wherein the computer executable instructions are configured to cause the processor to generate the first maintenance package based at least partially on a second alarm condition being present, wherein the second alarm condition is present at the same time as the first alarm condition.

* * * * *